(12) United States Patent
Chen et al.

(10) Patent No.: US 7,114,123 B2
(45) Date of Patent: Sep. 26, 2006

(54) USER CONTROLLABLE DATA GROUPING IN STRUCTURAL DOCUMENT TRANSLATION

(75) Inventors: Shyh-Kwei Chen, Chappaqua, NY (US); Jen-Yao Chung, Yorktown Heights, NY (US); Michael J. Ding, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 09/783,491

(22) Filed: Feb. 14, 2001

(65) Prior Publication Data

US 2002/0111964 A1 Aug. 15, 2002

(51) Int. Cl.
*G06F 15/00* (2006.01)
(52) U.S. Cl. .................. 715/513; 715/517; 715/500
(58) Field of Classification Search ................ 715/513, 715/517, 530, 500, 501.1
See application file for complete search history.

(56) References Cited

U.S. PATENT DOCUMENTS

| | | | | |
|---|---|---|---|---|
| 5,202,977 A | * | 4/1993 | Pasetes et al. ................ 703/27 |
| 5,878,419 A | * | 3/1999 | Carter ........................... 707/10 |
| 5,909,570 A | * | 6/1999 | Webber ......................... 703/13 |
| 6,507,856 B1 | * | 1/2003 | Chen et al. .................. 715/513 |
| 6,668,354 B1 | * | 12/2003 | Chen et al. .................. 715/517 |
| 6,725,424 B1 | * | 4/2004 | Schwerdtfeger et al. .... 715/513 |
| 6,732,330 B1 | * | 5/2004 | Claussen et al. ............ 715/513 |
| 2002/0002566 A1 | * | 1/2002 | Gajraj ........................... 707/513 |
| 2002/0023113 A1 | * | 2/2002 | Hsing et al. .................. 707/513 |
| 2002/0035606 A1 | * | 3/2002 | Kenton ......................... 709/206 |
| 2002/0156814 A1 | * | 10/2002 | Ho ............................... 707/514 |

OTHER PUBLICATIONS

Steve Muench, "XSL Transformations Requirements Version 1.1", http://www.w3.org/TR/2000/WD-xslt11req-20000825, pp. 1-6.*
"Document Object Model Events", http://www.w3.org/TR/DOM-Level-2-Events/events.htm, pp. 1-291.*

* cited by examiner

*Primary Examiner*—Stephen Hong
*Assistant Examiner*—Thu V. Huynh
(74) *Attorney, Agent, or Firm*—Whitham, Curtis, Christofferson & Cook, PC; Stephen C. Kaufman

(57) ABSTRACT

Methods and apparatus are provided which solves the looping problem in structural documents, such as those defined by DOM, EDI and XML. The method and apparatus remove ambiguities by presenting a user with a hierarchical tree structure representation of the document allowing the user to select data grouping rules to be followed. The method and apparatus then automatically create a modified hierarchical tree structure based upon the user-defined rules. Rules can be input by the user using a rule table editor or by means of a graphical user interface.

17 Claims, 6 Drawing Sheets

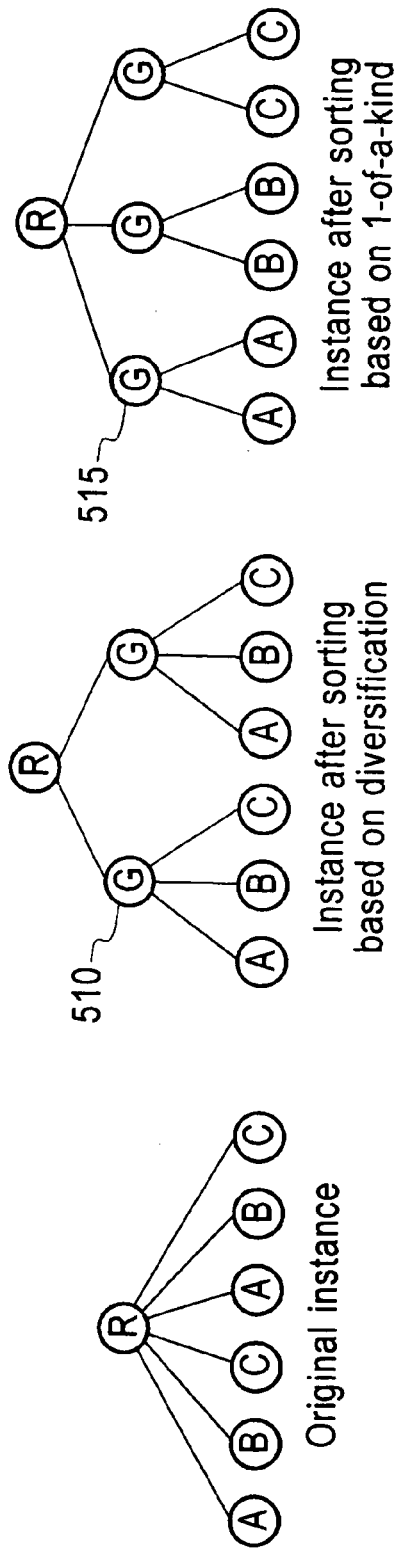

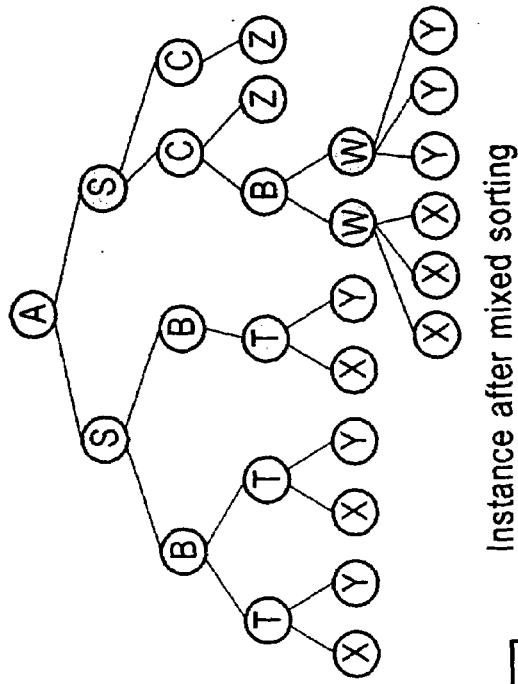
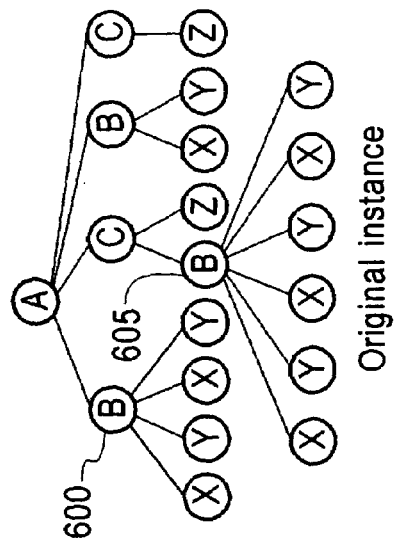

USER CONTROLLABLE DATA GROUPING IN STRUCTURAL DOCUMENT TRANSLATION

FIELD OF THE INVENTION

The present invention is related to the field of structural document translation and data grouping and, more particularly, to methods for user controllable data grouping.

BACKGROUND OF THE INVENTION

The extensible Markup Language (XML) is emerging as one of the most important formats for document and data representation and transmission. For example, business documents can be presented by XML for Internet transmission and World Wide Web access. More and more users and new applications are starting to require their input and output to be in XML format.

Details of XML are described in "Extensible Markup Language (XML) 1.0," W3C Recommendation Feb. 10, 1998, the disclosure of which is incorporated by reference herein. An XML document can be modeled as a tree, see "Document Object Model (DOM) Level 1 Specification, version 1.0," W3C Recommendation 1 Oct. 1998, the disclosure of which is incorporated by reference herein.

The Electronic Data Interchange (EDI) flat file format has been in use by the auto, health care, manufacturing and other industries, for more than 20 years. Due to the communication cost at the time the format was designed, data is highly compressed based on EDI maps and dictionaries.

The looping problem in structural documents, such as those defined by the Document Object Model (DOM) and extensible Markup Language (XML), can have a remarkable impact on application programming. The problem is that similar data items within a document may repeat several times, and that related data items are not properly grouped together. The problem is most severe in documents represented in flat file format, for example EDI, and there are few or no data grouping tags or position symbols to distinguish the occurrences of loops. Documents with poor data groupings may complicate the code structure of an application program that must read the document, as the programmers may need to write extra code to sort out the repeating data items and loops. In certain applications, such as XSL, the XML Stylesheet Language, "XSL Transformations (XSLT) 1.0," W3C Recommendation 16 Nov. 1999, this becomes difficult since the allowable structural construct and formatting style may be limited.

SUMMARY OF THE INVENTION

It is an object of the invention to provide a user controllable data grouping method and system that can be embedded in a translation algorithm, or run as a standalone transformation.

It is another object of the innovation to provide a generic data grouping method and system that can work on multiple, potentially infinite, structural documents that conform to the same DTD or schema.

It is another object of the innovation to provide a data grouping method and system that uses a concise and systematic algorithm that employs an intermediate table which is easy to manage/maintain so that users do not need to program the sorting and grouping such as using high-level languages (C++, Java, etc.), nor write complicated translation style sheets in XSLT.

It is another object of the invention to provide a data grouping method and system that uses a simple and user-friendly GUI, so that the sorting and grouping (i.e., translation) table itself can be made transparent to the users.

In accordance with these objectives, to accommodate various grouping choices without changing and rebuilding the translation or transformation procedures a user would otherwise employ to process a structural document, the invention provides a table structure for recording the different options entered by users. The users may enter various grouping choices into the table, for different nodes identified by paths based on the target schema or the Document Type Definition (DTD) graphs.

The invention includes a fixed translator which works on a structural table mostly created by the user, either using a standard text editor or graphical user interface (GUI) tool. The structural table can be expanded during run-time. The data grouping method is performed in accordance with user specifications. Depending on the document structure, there may be multiple locations/tags that the user desires to have different groupings. The table embeds user-defined, or automatically defined in accordance with user preferences, structural information for recording hierarchical data groupings. A significant benefit of the invention is the user-provided resolution of ambiguities that arise from the looping problem.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 5(A) illustrates a simple flat file DOM instance. FIGS. 5(B) and (C) illustrate two different grouping options for flat file transformation, where one option sorts based on diversification of sub-tree tags as in FIG. 5(B), and the other option sorts based on the same sub-tree tags as in FIG. 5(C). FIGS. 5(D) and (E) are corresponding tables for FIGS. 5(B) and (C); and FIG. 6 illustrates a more complicated example where the users may choose different grouping options for sorting different paths, even if they have the same tag names.

DETAILED DESCRIPTION OF PREFERRED EMBODIMENTS

Figure 1:
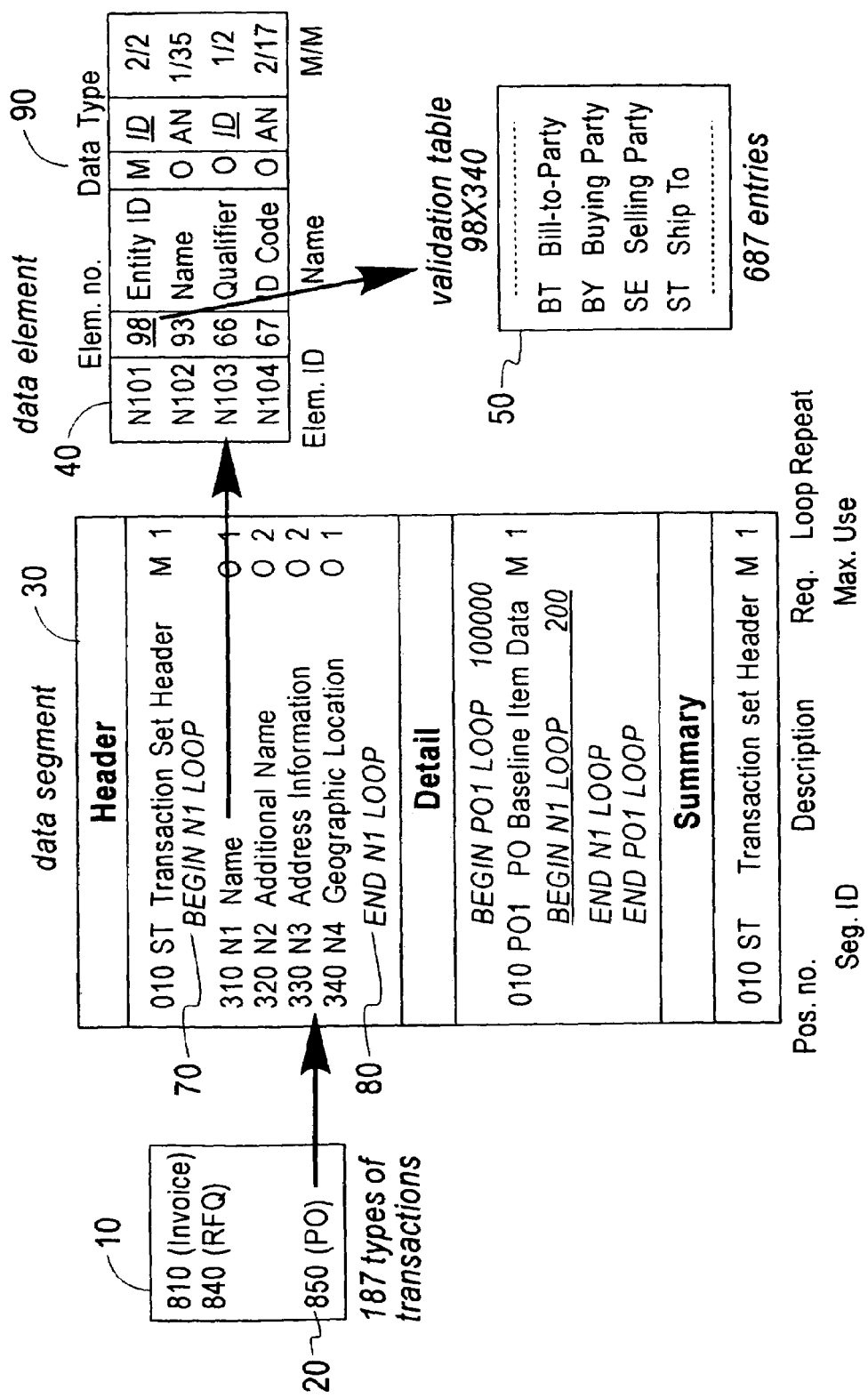
FIG. 1 is a partial ANSI X12 EDI superset map (version 003 release 040)

A detailed description of the invention will now follow. Such description will illustrate the system and method of the invention for user-controllable data grouping in structural document translation.

In this invention, any file format that can be parsed into a DOM tree structure can be used as an input document format. The file formats discussed in the following description of a preferred embodiment of this invention are XML and EDI, since both formats can have simple parsers to create DOM tree structures. The translation method of the present invention is based on a simple 2-column static translation table that includes source path data and target path data. The translation method creates a dynamic table automatically, which if not empty after the traversal will be used to remove special attributes assigned to a given node during passes through the static table. The present translation method builds a target DOM tree taking as input the source DOM tree. To build the target DOM tree, the method recursively traverses the source DOM tree in prefix ordering. For every node visited, the method uses the node's path data (traced from the root node of the source DOM tree) to match with those paths in the left column of the translation table. If there is a match, the method uses the user-defined (or automatically defined, based on user preferences) destination path in the right column of the translation table to create a path in the target DOM tree, by performing the following steps:

1. Parse the dot-separated destination path into a list of tags, say $P_1, P_2, \ldots, P_n$;
2. Create a root node (if one does not exist), say root, with tag $P_1$;
3. Remove the root node tag from the list;
4. parent_node←root;
5. While (tag list is not empty)
   Fetch and remove next tag from the list;
   The removed tag has three cases, $P_i$, $P_1[\#]$, and $P_i@['X']$;
   Case 1: $P_1$
      Locate the most recently created node, say r, with tag $P_1$;
      Case 1: If no such node exists, create one, say r, and append it to parent_node's children list;
   Case 2: $P_i[\#]$
      Create a new node, say r, with tag $P_i$;
      Append r to parent_node's children list;
   Case 3: $Pi@['X']$
      Locate the most recently created node, say r, with tag $P_1$, and attribute SORT-'X';
      If no such node exists, create one, say r, and append it to parent_node's children list;
      Record the tag and the attribute value to dynamic table;
   parent_node←r,
6. Copy the original value as the new value under parent_node, i.e., $P_n$;
7. If the dynamic table is not empty, traverse the target DOM tree to remove those attributes recorded in the table.

A GUI tool can be used so that the static and dynamic tables are totally transparent to users. The GUI tool can first display the DTD (for XML), or the map (for EDI), with nodes representing tags and edges representing parent-child relations. The users may click on any non-leaf node to choose grouping options (diversification or 1-of-a-kind), and to assign names for new target position tags. The tool generates the static table automatically after the user finishes editing. Such a GUI tool for performing this aspect of the invention can be implemented using known programming techniques.

Referring now to the drawings in which like numerals represent the same or similar elements and initially to FIG. 1, a partial ANSI X12 EDI superset map (version 003 release 040) is depicted. There are more than 187 transaction sets or document types as block 10. For example, the transaction set 20 with a number 850 is a purchase order (PO) document type. Every transaction set in accordance with EDI includes a map table as block 30, defining all the possible data segments that can be included in the transaction, and their orders. There are three sections in the map: header, detail, and summary. The column defining segment ID 60 lists all the possible data segments. Map table 30 includes position tags that can define nested loops. For example, the position tags BEGIN_N1_LOOP 70 and END_N1_LOOP 80 form a loop that includes four segments N1, N2, N3, and N4. However, the position tags will not be in EDI messages, which causes the looping problem or grouping problem when a program must process the EDI message. Also in accordance with EDI, every data segment can have a corresponding data element table, which further defines smaller entities for the data segment. For example, data element table 40 relates to the N1 segment, and defines four elements N101, N102, N103, and N104. There is a data type 90 for each data element. For the data type ID, it means that the content of the current data element is a shorthand notation, and should be decoded using a corresponding validation table. For example, the block at 50 is for data element N101 with element number 98, and includes full descriptions on trading partners or roles. There are more than 600 entries in this table.

Figure 2:
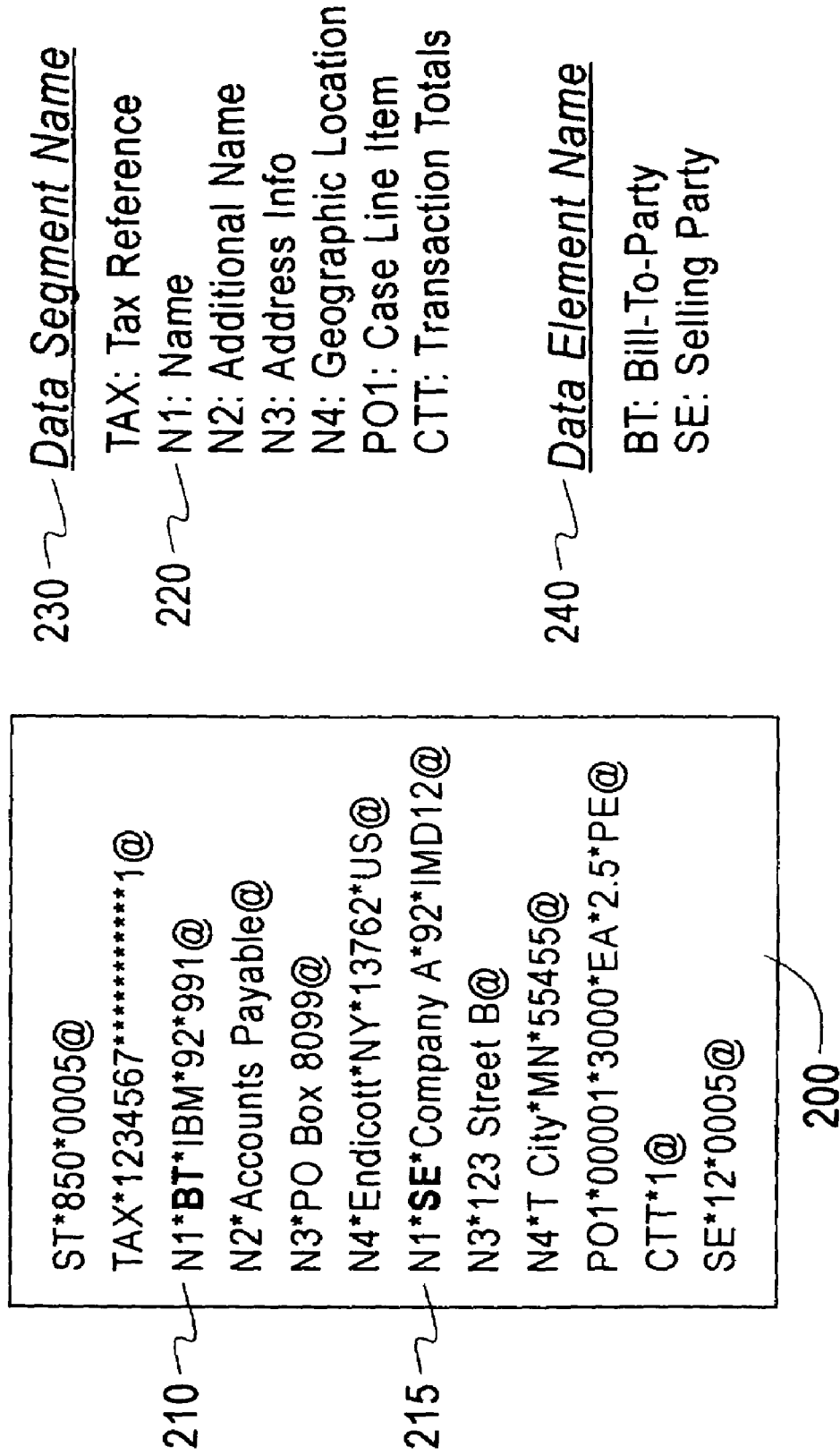
FIG. 2 is a sample PO message in EDI format.

FIG. 2 illustrates a sample PO message in EDI format as block 200. The data segment name table as 230 and data element name table as 240 can help understand the meaning of the EDI message. There are two loops related to N1, as indicated by the N1 segments at 210 and 215. The real message is a flat file as shown in 200, which has no position tags to indicate the presence of these loops.

Figure 3:
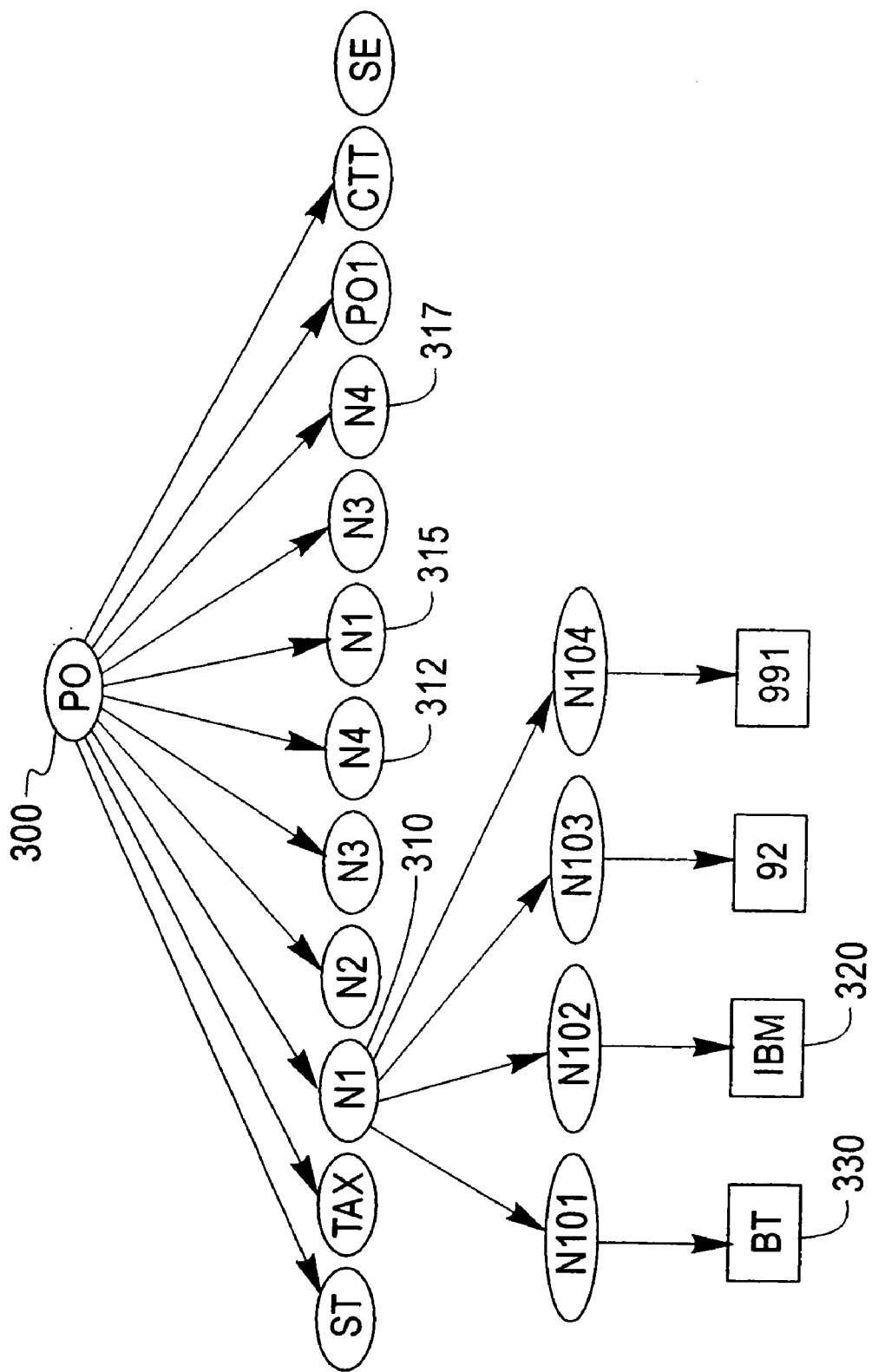
FIG. 3 depicts the partial DOM tree for the sample PO EDI in FIG. 2.

FIG. 3 depicts the partial DOM tree for the sample PO EDI in FIG. 2. The oval boxes like 300 denote the EDI structure related contents, and the square boxes like 320 represent the real data contents. There are four levels in this graph, where the first level is the transaction set, the second level relates to the data segments, the third relates to the data elements, and the last level relates to the real data. The real data may include the shorthand representation like the square box 330 that includes "BT", denoting "Bill-To-Party". This graph also shows the looping problem: there are two loops related to loop N1, where one begins at the oval box 310 and ends at the oval box 312, and the other begins at the oval box 315 and ends at the oval box 317.

Figure 4:
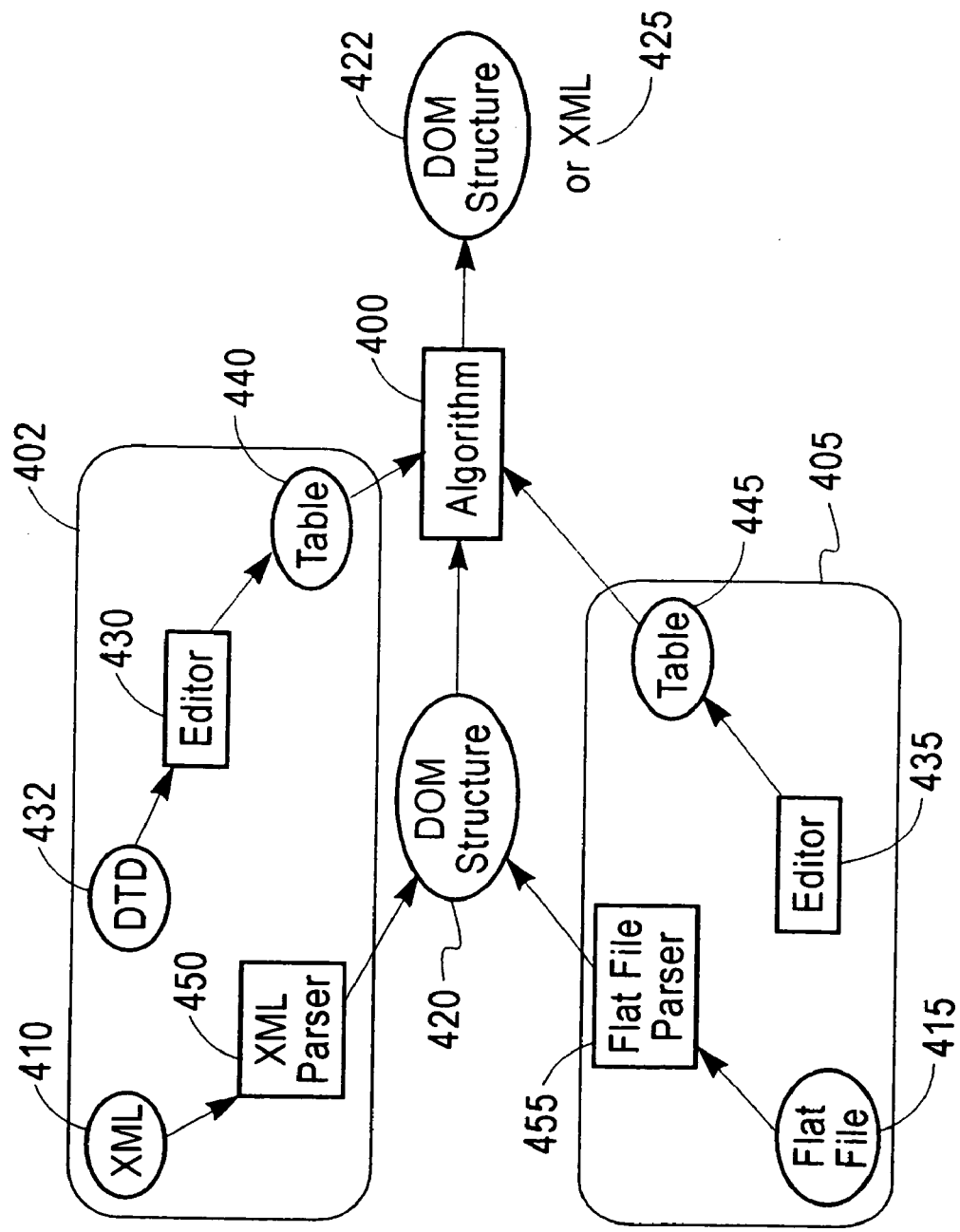
FIG. 4 depicts the flow diagram of the translator that can solve the looping problem for either XML or EDI flat file as sources.

FIG. 4 depicts a flow diagram of the translator in accordance with the invention that can solve the looping problem for either XML or EDI flat files as sources. The XML translator is shown as 402 and EDI translator is shown as 405. Taking as input either XML 410 or flat file (EDI) 415 documents, the XML parser 450 or flat file parser 455, as the case may be, generates an intermediate DOM tree instance 420. Taking as input the intermediate DOM structure instance 420, and outputting a translated DOM structure instance 422 or XML document 425, the translation algorithm 400 (described above) effectively solves the looping problem. The users may use a plain text editor or more advanced GUI editor 430 and 435 to modify the 2-column static translation table blocks 440 and 445 specifying how they want to sort the documents. The GUI tool for the XML case can display and use the DTD 432 as a reference.

FIGS. 5(B) and (C) illustrate two different grouping options for flat file transformation of the original DOM instance shown in FIG. 5(A), where one option sorts based on diversification of sub-tree tags as in FIG. 5(B), and the other option sorts based on the same sub-tree tags as in FIG. 5(C). For example, the node G at 510 collects A, B, and C, and the node G at 515 collects two A's. The G's will be included in the target DOM tree or XML document, representing the loop grouping nodes. FIGS. 5(D) and (E) are corresponding tables for generating the trees of FIGS. 5(B) and (C). The static tables like table 520 and table 525 are created by users, using a plain text editor or GUI tool. The dynamic table like table 530 can be an intermediate structure, generated during run-time. The tables include two columns specifying the original paths (left column) and the user-defined rules to create the new paths for matched paths (right column). The target DOM trees or XML documents are constructed using the set of matching paths in the right column. The "[#]" after a tag name G like 540 denotes always creating a new node with the same tag name (G). The "@['X']" after a tag name W like 545 denotes looking for a node along a specified path (right column) with tag name W and attribute SORT='X'. The attributed name "SORT" must be unique. If no such node exists, then one is created. The dynamic table is used to remove attributes for certain nodes.

FIG. 6 illustrates a more complicated example where the users may choose different grouping options for sorting different paths, even if they have the same tag names like the B nodes at 600 and 605. For example, the tag name B occurs on two different paths, A.B and A.C.B, where each path has a different sorting option. The paths A.B.X and A.B.Y sort X's and Y's diversely, as shown on the right column of rules at 624 and 626. The T nodes are inserted to be the looping tags. The paths A.C.B.X and A.C.B.Y sort X's and Y's using a 1-of-a-kind rule and into two groups, group X and group Y, as shown on the right column of the rules at 628 and 630. The use of attribute '@' at 645 directs the algorithm to choose the 1-of-a-kind rule. The W nodes are inserted to serve as the looping tags. The example also shows two different levels of sorting, where the first level sorts A.B and A.C like 620 and 622 in 1-of-a-kind style like 640, and the second level sorts the groups of X's and Y's. The temporary dynamic table is created to record any attributes that are generated. If no such dynamic table is created, the algorithm completes its translation. Otherwise a second pass through the target DOM tree is performed, to remove all of the attributes that are associated with nodes during the previous pass. For example, the rules at 640 and 645 introduce attributes for nodes S and W respectively, that can be matched by the left column at 632 and 634. Such attributes are removed using rules at 650 and 655.

The invention described herein preferably is implemented as a program running on a general purpose computer. The invention also may be implemented and used as instructions stored or embodied in a computer program product such as a magnetic or optical disk, hard disk drive, memory, or other storage means known to those skilled in the art.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer-implemented method for processing a structural document to remove ambiguities from the document prior to processing, comprising the steps of:
   identifying ambiguities within a structural document in electronic format to include data loops that are not marked as loops;
   representing the structural document in electronic format as a hierarchical tree structure, using computing resources;
   receiving, within said computing resources, translation rules and data loop grouping options defined by a user in a static translation table with reference to the hierarchical tree structure;
   creating a dynamic translation table to resolve said ambiguities for said hierarchical tree structure; and
   automatically generating, using said computing resources, a modified hierarchical tree structure representing the structural document in electronic format in accordance with the translation rules and grouping options.

2. The method of claim 1, wherein the translation rules include rules for grouping elements of the structural document.

3. The method of claim 2, wherein the rules for grouping are selected from the group consisting of: diversification of sub-tree tags, and identity of sub-tree tags.

4. The method of claim 3, wherein the rules for grouping are represented as a two column table wherein a first column of the table defines a plurality of nodes in the hierarchical tree structure, and a second column of the table defines a rule to be applied to grouping each of one of the plurality of nodes.

5. The method of claim 1, wherein the hierarchical tree structure is Document Object Model, and the structural document in electronic format to be translated is in a format selected from the group consisting of: flat file and Extensible Markup Language.

6. The method of claim 1, wherein the step of automatically generating, using said computing resources, a modified hierarchical tree structure comprises processing each node of the hierarchical tree structure in accordance with the translation rules, automatically generating a dynamic table representing an interim translation of the hierarchical tree structure, and generating the modified hierarchical tree structure from the interim translation.

7. The method of claim 1, wherein the translation rules are generated by the user by means of a graphical user interface that displays to the user various data elements of the structural document represented as nodes in a hierarchical tree structure.

8. The method of claim 1, wherein the ambiguities to be removed from the structural document include data loops that are not marked as loops.

9. A system of computer resources for processing a structural document to remove ambiguities from the document prior to processing, comprising:
   means within a system of computer resources for identifying ambiguities within a structural document in electronic format to include data loops that are not marked as loops;
   means within a system of computer resources for representing the structural document in electronic format as a hierarchical tree structure;
   means within a system of computer resources for receiving translation rules and data loop grouping options from a user having reference to the hierarchical tree structure;
   means within a system of computer resources for creating a dynamic translation table to resolve said ambiguities for said hierarchical tree structure; and
   means within a system of computer resources for automatically generating a modified hierarchical tree structure representing the structural document in accordance with the translation rules and grouping options.

10. The system of claim 9, wherein the translation rules include rules for grouping elements of the structural document.

11. The system of claim 10, wherein the rules for grouping are selected from the group consisting of: diversification of sub-tree tags, and identity of sub-tree tags.

12. The system of claim 11, wherein the rules for grouping are represented as a two column table wherein a first column of the table defines a plurality of nodes in the hierarchical tree structure, and a second column of the table defines a rule to be applied to grouping each of one of the plurality of nodes.

13. The system of claim 9, wherein the hierarchical tree structure is Document Object Model, and the structural document to be translated is in a format selected from the group consisting of: flat file and Extensible Markup Language.

14. The system of claim 9, wherein the means for automatically generating a modified hierarchical tree structure comprises means for processing each node of the hierarchical tree structure in accordance with the translation rules, automatically generating a dynamic table representing an interim translation of the hierarchical tree structure, and generating the modified hierarchical tree structure from the interim translation.

15. The system of claim 9, further comprising a graphical user interface that displays to the user data elements of the structural document as nodes in a hierarchical tree structure, means for allowing the user to select grouping options for such nodes, and means for transforming the selected grouping options into the translation rules.

16. The system of claim 9, wherein the ambiguities to be removed from the structural document include data loops that are not marked as loops.

17. A computer program product comprising:
   a computer usable medium having computer readable program code means embodied therein for processing a structural document in electronic format to remove ambiguities from the document prior to processing, the computer readable program code means in said computer program product making a computer execute:
      process for identifying ambiguities within a structured document in electronic format to include data loops that are not marked as loops;
   process for causing a computer to effect representing the structural document as a hierarchical tree structure;
   process for causing a computer to effect receiving translation rules and data loop grouping options defined by a user in a static translation table with reference to the hierarchical tree structure;
   process for creating a dynamic translation table to resolve said ambiguities for said hierarchical tree structure; and
   process for causing a computer to effect automatically generating a modified hierarchical tree structure representing the structural document in accordance with the translation rules and grouping options.

* * * * *